United States Patent
Zhou et al.

(10) Patent No.: US 8,834,745 B2
(45) Date of Patent: Sep. 16, 2014

(54) OXYHALIDE LUMINESCENT MATERIAL DOPED WITH RARE EARTH CONTAINING METAL PARTICLE AND PRODUCTION METHOD THEREOF

(75) Inventors: Mingjie Zhou, Shenzhen (CN); Jun Liu, Shenzhen (CN); Wenbo Ma, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 67 days.

(21) Appl. No.: 13/699,951

(22) PCT Filed: May 27, 2010

(86) PCT No.: PCT/CN2010/073290
§ 371 (c)(1),
(2), (4) Date: Nov. 26, 2012

(87) PCT Pub. No.: WO2011/147088
PCT Pub. Date: Dec. 1, 2011

(65) Prior Publication Data
US 2013/0069006 A1 Mar. 21, 2013

(51) Int. Cl.
*C09K 11/77* (2006.01)
*C09K 11/87* (2006.01)
*B82Y 30/00* (2011.01)

(52) U.S. Cl.
CPC ........... *C09K 11/873* (2013.01); *C09K 11/7772* (2013.01); *C09K 11/87* (2013.01); *B82Y 30/00* (2013.01)
USPC .................................................. 252/301.4 H

(58) Field of Classification Search
USPC .................................................. 252/301.4 H
See application file for complete search history.

(56) References Cited

U.S. PATENT DOCUMENTS

| | | | |
|---|---|---|---|
| 6,946,785 B2 | 9/2005 | Ito et al. | |
| 7,670,578 B2 | 3/2010 | Iltis | |
| 2008/0237470 A1 | 10/2008 | Loureiro et al. | |

FOREIGN PATENT DOCUMENTS

| | | |
|---|---|---|
| CN | 1334309 A | 2/2002 |
| CN | 1522291 A | 8/2004 |
| CN | 101646748 A | 2/2010 |
| JP | 11293240 A | 10/1999 |
| JP | 2002311234 A | 10/2002 |

*Primary Examiner* — Carol M Koslow
(74) *Attorney, Agent, or Firm* — Shimokaji & Associates P.C.

(57) ABSTRACT

An oxyhalide luminescent material doped with rare earth containing metal particles is provided. The formula thereof is $Re'_{1-x}Re''_xOX:yM$, in which $Re'$ is the first rare earth element, $Re''$ is the second rare earth element, X is F, Cl or Br, M is metal nanoparticles, x is 0.001-0.15, and y is $5 \times 10^{-5}$-$2 \times 10^{-3}$. A method for producing the luminescent material is also provided. By virtue of metal particles introduced into the oxyhalide luminescent material doped with rare earth and the surface plasma resonance effect of the metal surface, the luminescence intensity of the oxyhalide luminescent material is improved. The good stability, uniform appearance and excellent luminescence intensity of the luminescent material ensure its application in field emission devices. The production method has advantages of simplicity in operating, pollution-free, easy control, less demanding for equipment and suitability for industrialized production.

12 Claims, 3 Drawing Sheets

OXYHALIDE LUMINESCENT MATERIAL DOPED WITH RARE EARTH CONTAINING METAL PARTICLE AND PRODUCTION METHOD THEREOF

FIELD OF THE INVENTION

The present invention relates to luminescent material and production method thereof. More particular, the present invention relates to an oxyhalide luminescent material doped with rare earth containing metal particles and production method thereof.

BACKGROUND OF THE INVENTION

In recent years, field emission devices have attracted much attention due to the advantages, such as low operating voltage, low power consumption, no deflection coil, no X-ray radiation, radiation resistance and magnetic interference resistance, etc. By exciting the luminescent material using field emission cathode ray, field emission light source of high luminance and good color rendering properties can be obtained, which can be applied to professional lighting, display, instructions, general lighting and other fields. Thus, it is meaningful for researches on field emission devices of excellent performances to prepare luminescent materials of great performances.

At present, commercial luminescent materials are mainly from such luminescent material of traditional cathode-ray tube and projection television kinescope as sulfide series, oxide series and oxysulfide series. For example, $ZnS:Ag,Cl$, $SrGa_2S_4:Ce$, $SrGa_2S_4:Eu$, $Y_2O_2S:Eu$, $Y_2SiO_5:Ce$, $ZnGa_2O_4:Mn$, $Y_2SiO_5:Tb$, $Y_3Al_5O_{12}:Tb$ and $Y_2O_3:Eu$, etc. Herein, sulfides have high luminance but less stability; oxides have good stability but worse luminance and conductivity than sulfides. Consequently, lots of researchers focus on investigating luminescent materials having good stability and high luminance. Efforts have been directed toward modifying such luminescent materials or developing new luminescent materials having great performances used in field emission devices.

SUMMARY OF THE INVENTION

The technical problems of the present invention to be solved is to provide an oxyhalide luminescent material doped with rare earth having good stability, high internal quantum efficiency and high luminous intensity, and production method thereof.

The technical solution to solve the technical problem of the present invention is to provide an oxyhalide luminescent material doped with rare earth containing metal particles, wherein said oxyhalide luminescent material doped with rare earth containing metal particles has chemical formula of $Re'_{1-x}Re''_xOX$ and yM, wherein Re' is the first rare earth element, Re'' is the second rare earth element; X is F, Cl or Br, M is metal nanoparticles, x is in the range of 0.001 to 0.15, and molar amounts y is in the range of $5\times10^{-5}$ to $2\times10^{-3}$.

In the luminescent material of the present invention, said first rare earth element Re' is Y, La or Sc, said second rare earth element Re'' is Tm, Tb, Eu, Sm, Gd, Dy or Ce. Said metal nanoparticles M is Ag, Au, Pt or Pd metal nanoparticles.

And, a production method of oxyhalide luminescent material doped with rare earth containing metal particles, including the following steps:

step 1: producing metal nanoparticles colloid;
step 2: surface treating the metal nanoparticles by adding metal nanoparticles colloid to the polyvinylpyrrolidone solution;
step 3: weighing rare earth oxide or rare earth oxalate and dissolving in dense nitric acid, heating and evaporating superfluous nitric acid to form rare earth halide salt;
step 4: adding mixed solution of water and ethanol in volume ratio of 1:3 to 8 and metal nanoparticles obtained in step 2 into step 3, stirring, adding citric acid mono hydrate to make the mole ratio of citric acid to metal ion be 1 to 5:1, adding polyethylene glycol and excess ammonium halide successively, heating in water bath and stirring to form precursor colloid;
step 5: obtaining dry colloid by drying the precursor in step 4, grinding dry colloid in powder, pre-calcinating on constant temperature, cooling, calcinating in the air or reduction atmosphere after grinding, cooling to obtain oxyhalide luminescent material doped with rare earth containing metal particles, pre-calcinating is carried out in the temperature range of 500° C. to 800° C. for 2 to 6 h.

In the production method of the present invention, in said step 1, the method of producing metal nanoparticles colloid comprises: dissolving and diluting appropriate solution of metal salt in ethanol or water; under the conditions of magnetic stirring, successively adding assist agent which act the role as stabilizer and dispersant and adding reducing agent, after the reaction, metal nanoparticles colloid is obtained; said assist agent is polyvinylpyrrolidone, sodium citrate, cetyl trimethyl ammonium bromide, sodium dodecyl sulfate or sodium dodecyl sulfonate, said reducing agent is hydrazine hydrate, ascorbic acid, sodium citrate or sodium borohydride.

In the production method of the present invention, in said step 4, the concentration of said polyethylene glycol is in the range of 0.01 to 0.20 g/ml, the heating in water bath is carried out in the temperature range of 75° C. to 90° C., the time of stirring is in the range of 2 to 8 h; adding ammonium halide in excess of 5% to 50% by mole ratio into obtained precursor colloid.

When the halogen in oxyhalide luminescent material is chlorine, in said step 3, rare earth oxide or rare earth oxalate is dissolved in dense hydrochloric acid instead of dense nitric acid, heating and evaporating superfluous dense hydrochloric acid to form rare earth chloride; accordingly, in step 4, it is not necessary to add excessive ammonium chloride into obtained precursor colloid.

In said step 5, said drying is carried out in blast drying oven and in the temperature range of 80° C. to 120° C. for 4 to 24 h; pre-calcinating is carried out in the temperature range of 500° C. to 800° C. for 2 to 6 h; calcinating is carried out in the temperature range of 800° C. to 1000° C. for 2 to 6 h; said reduction atmosphere is selected from mixed gases of nitrogen and hydrogen, pure hydrogen, and carbonic oxide.

Compared with the prior art, by virtue of introduction of metal particles into the oxyhalide luminescent material doped with rare earth and the surface plasma resonance effect of the metal surface, the present invention improves the luminescence intensity of the oxyhalide luminescent material. The luminescent material of the present invention has good stability, uniform appearance, excellent luminescent performances, and, both the purity and luminance of the emitting light after excitation are high, so can be applied in field emission devices. The production method has advantages of simple process, no pollution, less demand on equipment, and it is easy to control, favorable for industrialized production, can be widely used in the field of producing luminescent material.

BRIEF DESCRIPTION OF THE DRAWINGS

Further description of the present invention will be illustrated, which combined with embodiments in the drawings.

DETAILED DESCRIPTION OF ILLUSTRATED EMBODIMENTS

Figure 1:
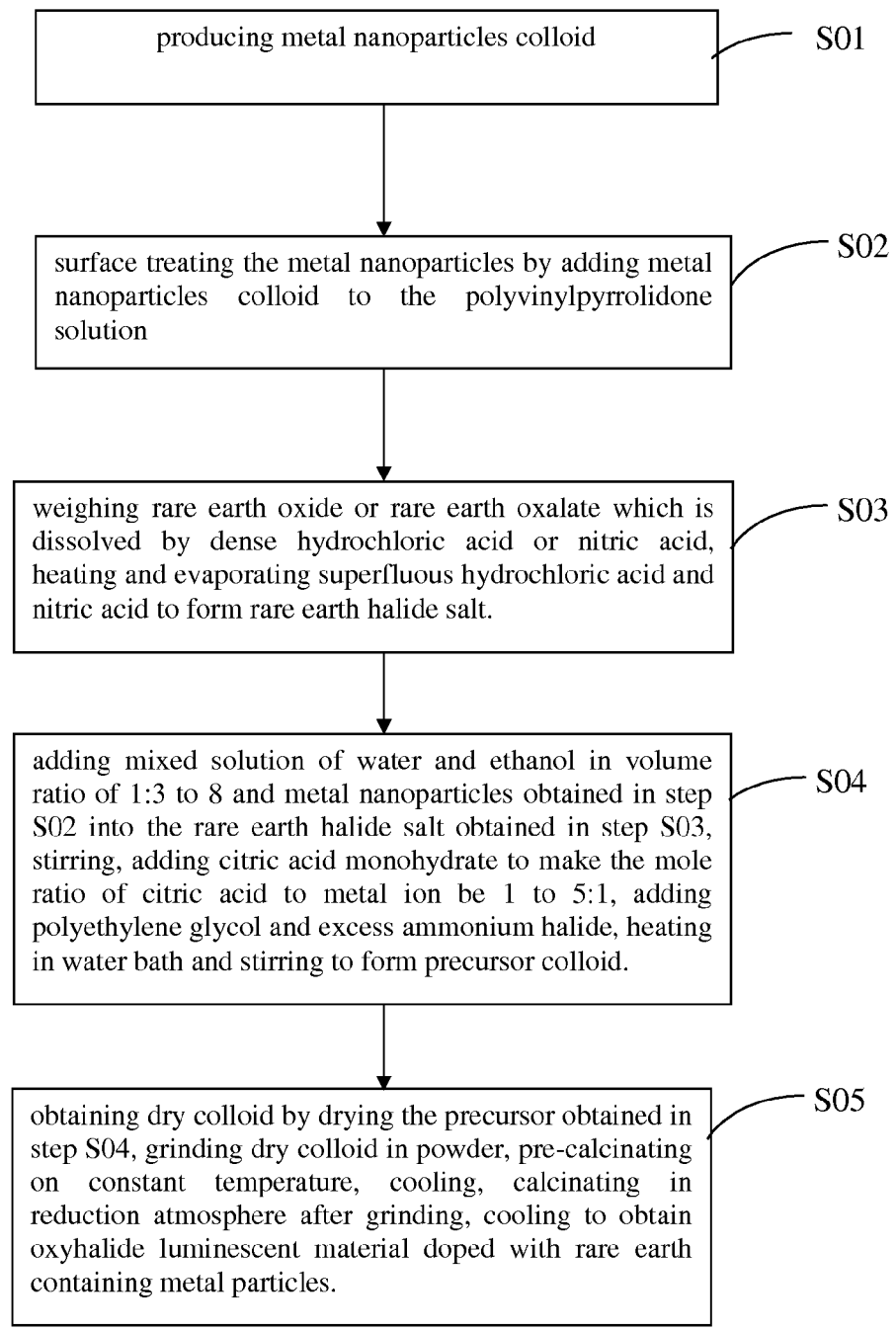
FIG. 1 is a flow chart of the production method of oxyhalide luminescent material doped with rare earth containing metal particles of the present invention.

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

The present invention provides an oxyhalide luminescent material doped with rare earth containing metal particles, wherein said oxyhalide luminescent material doped with rare earth containing metal particles has chemical formula of $Re'_{1-x}Re''_{x}OX$ and yM, wherein Re' is the first rare earth element, Re'' is the second rare earth element; X is F, Cl or Br, M is metal nanoparticles, x is in the range of 0.001 to 0.15, and molar amounts y is in the range of $5\times10^{-5}$ to $2\times10^{-3}$.

In the luminescent material of the present invention, said first rare earth element Re' is Y, La or Sc, said second rare earth element Re'' is Tm, Tb, Eu, Sm, Gd, Dy or Ce. Said metal nanoparticles M is Ag, Au, Pt or Pd metal nanoparticles.

Referring to FIG. 1, it will be understood that FIG. 1 shows the process of the production method of the present invention, the production method comprises:

S01: producing metal nanoparticles colloid;

S02: surface treating the metal nanoparticles by adding metal nanoparticles colloid to the polyvinylpyrrolidone solution;

S03: weighing rare earth oxide or rare earth oxalate and dissolving in dense nitric acid, heating and evaporating superfluous nitric acid to form rare earth nitrate;

S04: adding mixed solution of water and ethanol in volume ratio of 1:3 to 8 and metal nanoparticles obtained in step 2 into step 3, stirring, adding citric acid monohydrate to make the mole ratio of citric acid to metal ion be 1 to 5:1, adding polyethylene glycol and excess ammonium halide successively, heating in water bath and stirring to form precursor colloid;

S05: obtaining dry colloid by drying the precursor obtained in step 4, grinding dry colloid in powder, pre-calcinating on constant temperature, cooling, calcinating in reduction atmosphere after grinding, cooling to obtain oxyhalide luminescent material doped with rare earth containing metal particles, pre-calcinating is carried out in the temperature range of 500° C. to 800° C. for 2 to 6 h.

In the production method of the present invention, in said S01, the method of producing metal nanoparticles colloid comprises: dissolving and diluting appropriate solution of metal salt in ethanol or water; under the conditions of magnetic stirring, successively adding assist agent and reducing agent, after the reaction, metal nanoparticles colloid is obtained. Said assist agent is polyvinylpyrrolidone, sodium citrate, cetyl trimethyl ammonium bromide, sodium dodecyl sulfate or sodium dodecyl sulfonate, said reducing agent is hydrazine hydrate, ascorbic acid, sodium citrate or sodium borohydride.

In the production method of the present invention, in said S04, the concentration of polyethylene glycol is in the range of 0.01 to 0.20 g/ml, the heating in water bath is carried out in the temperature range of 75° C. to 90° C., the time of stirring is in the range of 2 to 8 h; adding ammonium halide in excess of 5% to 50% by mole ratio into obtained precursor colloid.

In the production method of the present invention, in said S03, rare earth oxide or rare earth oxalate can be dissolved in dense hydrochloric acid instead of dense nitric acid, heating and evaporating superfluous dense hydrochloric acid to form rare earth chloride; accordingly, in S04, it is not necessary to add excessive ammonium chloride into obtained precursor colloid.

In said S05, said drying is carried out in blast drying oven and in the temperature range of 80° C. to 120° C. for 4 to 24 h; pre-calcinating is carried out in the temperature range of 500° C. to 800° C. for 2 to 6 h; calcinating is carried out in the temperature range of 800° C. to 1000° C. for 2 to 6 h; said reduction atmosphere is selected from mixed gases of nitrogen and hydrogen, pure hydrogen, and carbonic oxide.

Compared with the prior art, by virtue of introduction of metal particles into the oxyhalide luminescent material doped with rare earth and the surface plasma resonance effect of the metal surface, the present invention improves the luminescence intensity of the oxyhalide luminescent material. The luminescent material of the present invention has good stability, uniform appearance, excellent luminescent performances, and, both the purity and luminance of the emitting light after excitation are high, so can be applied in field emission devices. The production method has advantages of simple process, no pollution, less demand on equipment, and it is easy to control, favorable for industrialized production, can be widely used in the field of producing luminescent material.

Special examples are disclosed as follows to demonstrate production method of oxyhalide luminescent material doped with rare earth containing metal particles of the present invention and other properties.

Example 1

Production of $Y_{0.999}Tm_{0.001}OCl$: $1.5\times10^{-4}Pt$ by Using Sol-Gel Method The production of Pt nanoparticles, including the following steps: weighing and dissolving 5.18 mg of chloroplatinic acid ($H_2PtCl_6.6H_2O$) in 17 mL of deionized water; after chloroplatinic acid dissolved completely, weighing and dissolving 8 mg of sodium citrate and 12 mg of sodium dodecyl sulfonate in the aqueous solution of chloroplatinic acid under the condition of magnetic stirring; weighing and dissolving 0.38 mg of sodium borohydride in 10 mL of deionized water obtaining 10 mL of $1\times10^{-3}$ mol/L aqueous solution of sodium borohydride, preparing 10 mL of $1\times10^{-2}$ mol/L hydrazine hydrate solution at the same time; under the condition of magnetic stirring, adding 0.4 mL aqueous solution of sodium borohydride into the aqueous solution of chloroplatinic acid, stirring and reacting for 5 min, and then adding 2.6 mL of $1\times10^{-2}$ mol/L hydrazine hydrate solution into the aqueous solution of chloroplatinic acid, continue to react for 40 min, then obtaining 20 mL of Pt nanoparticle colloid containing $5\times10^{-4}$ mol/L of Pt; then adding 3.0 mg of PVP into 3 mL of obtained Pt nanoparticle colloid, magnetically stirring for 12 h. The surface-treated Pt nanoparticles is obtained.

The production of $Y_{0.999}Tm_{0.001}OCl$: $1.5\times10^{-4}Pt$, including the following steps: placing 2.2558 g of $Y_2O_3$ and 0.0039 g of $Tm_2O_3$ into a beaker, dissolving in dense hydrochloric acid (HCl), heating to evaporate superfluous HCl, rare earth halide salt is obtained; adding certain amount of mixed solution of 10 ml of water and 30 ml of ethanol to dissolve, adding said treated metal nanoparticles colloid and stirring completely; adding 2.1014 g of citric acid monohydrate, herein the mole ratio of citric acid to metal ion in raw material is 1:1, then adding 0.46 g of polyethylene glycol (PEG, molecular weight is 10000), the concentration of polyethylene glycol is 0.01 g/ml, stirring in a 75° C. water bath for 8 h to obtain uniform and transparent precursor colloid; drying the colloid in blast drying oven at 80° C. for 24 h to evaporate solvent obtaining dry colloid; grinding the obtained dry colloid in powder, pre-calcinating in box-type high-temperature furnace at the temperature maintained at 500° C. for 6 h, cooling, grinding to obtain precursor; then placing the precursor into box-type high-temperature furnace, calcinating in air atmosphere at 1000° C. for 2 h, naturally cooling. The desired luminescent material is obtained.

Example 2

Production of $La_{0.995}Sm_{0.005}OCl$: $1\times10^{-4}Au$ by Using Sol-Gel Method The production of Au nanoparticles, including the following steps: weighing and dissolving 4.12 mg of chloroauric acid ($AuCl_3 \cdot HCl \cdot 4H_2O$) in 8.4 mL of deionized water; after chloroauric acid dissolved completely, weighing and dissolving 14 mg of sodium citrate and 6 mg of cetyl trimethyl ammonium bromide in the aqueous solution of chloroauric acid under the condition of magnetic stirring; weighing and dissolving 1.9 mg of sodium borohydride and 17.6 mg of ascorbic acid in 10 mL of deionized water, respectively, obtaining 10 mL of $5\times10^{-3}$ mol/L aqueous solution of sodium borohydride and 10 mL of $1\times10^{-2}$ mol/L aqueous solution of ascorbic acid; under the condition of magnetic stirring, adding 0.04 mL aqueous solution of sodium borohydride into the aqueous solution of chloroauric acid, stirring and reacting for 5 min, and then adding 1.56 mL of $1\times10^{-2}$ mol/L aqueous solution of ascorbic acid into the aqueous solution of chloroauric acid, continue to react for 30 min, then obtaining 10 mL of Au nanoparticle colloid containing $5\times10^{-3}$ mol/L of Au; adding 2 mg of PVP, into 1 mL of obtained Au nanoparticle colloid, and magnetically stirring for 8 h. The surface-treated Au nanoparticle is obtained.

The production of $La_{0.995}Sm_{0.005}OCl$: $1\times10^{-4}Au$, including the following steps: placing 3.2418 g of $La_2O_3$ and 0.0174 g of $Sm_2O_3$ into a beaker, dissolving in dense nitric acid ($HNO_3$), heating to evaporate superfluous nitric acid, rare earth nitrate is obtained; adding certain amount of mixed solution of 10 ml of water and 50 ml of ethanol and said treated metal nanoparticles colloid, stirring completely; adding 8.5656 g of citric acid monohydrate, to make the mole ratio of citric acid to metal ion in raw material be 4:1, then adding 6.6 g of polyethylene glycol (PEG, molecular weight is 10000) and 0.2140 g of ammonium chloride ($NH_4Cl$, in excess of 40%) successively, the concentration of polyethylene glycol is 0.1 g/ml, stirring in a 85° C. water bath for 4 h to obtain uniform and transparent precursor colloid; drying the colloid in blast drying oven at 100° C. for 8 h to evaporate solvent obtaining dry colloid; grinding the obtained dry colloid in powder, pre-calcinating in box-type high-temperature furnace at the temperature maintained at 600° C. for 4 h, cooling, grinding to obtain precursor; then placing the precursor into tube furnace, calcinating in air atmosphere at 800° C. for 4 h, naturally cooling. The desired luminescent material is obtained.

Example 3

Production of $La_{0.985}Tb_{0.01}Sm_{0.005}OCl$: $4\times10^{-4}Ag$ by Using Sol-Gel Method The production of Ag nanoparticles, including the following steps: weighing and dissolving 3.40 mg of silver nitrate ($AgNO_3$) in 18.4 mL of deionized water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in 10 mL of deionized water obtaining 10 ml of $1.5\times10^{-2}$ mol/L aqueous solution of sodium borohydride; under the condition of magnetic stirring, adding 1.6 mL of $1.5\times10^{-2}$ mol/L aqueous solution of sodium borohydride into the aqueous solution of silver nitrate at once, continue to react for 10 min, then obtaining 20 mL of Ag nanoparticle colloid containing $1\times10^{-3}$ mol/L of Ag; adding 5 mg of PVP into 4 mL of obtained Ag nanoparticle colloid, and magnetically stirring for 6 h. The surface-treated Ag nanoparticle is obtained.

The production of $La_{0.985}Tb_{0.01}Sm_{0.005}OCl$: $4\times10^{-4}Ag$, including the following steps: placing 3.2092 g of $La_2O_3$, 0.0374 g of $Tb_4O_7$ and 0.0349 g of $Sm_2O_3$ into a beaker, dissolving in dense hydrochloric acid (HCl), heating to evaporate superfluous HCl, rare earth halide salt is obtained; adding certain amount of mixed solution of 10 ml of water and 50 ml of ethanol in volume ratio of 1:5, and adding said treated metal nanoparticles colloid, stirring completely; adding 6.3042 g of citric acid monohydrate, herein the mole ratio of citric acid to metal ion in raw material is 3:1, then adding 10.2 g of polyethylene glycol (PEG, molecular weight is 10000), the concentration of polyethylene glycol is 0.15 g/ml, stirring in a 80° C. water bath for 2 h to obtain uniform and transparent precursor colloid; drying the colloid in blast drying oven at 120° C. for 4 h to evaporate solvent obtaining dry colloid; grinding the obtained dry colloid in powder, pre-calcinating in box-type high-temperature furnace at the temperature maintained at 800° C. for 3 h, cooling, grinding to obtain precursor; then placing the precursor into box-type high-temperature furnace, calcinating in air atmosphere at 900° C. for 4 h, naturally cooling. The desired luminescent material is obtained.

Example 4

Production of $La_{0.98}Eu_{0.02}OCl$: $1\times10^{-4}Pd$ by Using Sol-Gel Method The production of Pd nanoparticles, including the following steps: weighing and dissolving 0.43 mg of palladium chloride ($PdCl_2 \cdot 2H_2O$) in 8.5 mL of deionized water; after palladium chloride dissolved completely, weighing and dissolving 11.0 mg of sodium citrate and 4.0 mg of sodium dodecyl sulfate in the aqueous solution of palladium chloride under the condition of magnetic stirring; weighing and dissolving 3.8 mg of sodium borohydride in 10 mL of deionized water obtaining $1\times10^{-2}$ mol/L reducing aqueous solution of sodium borohydride; under the condition of magnetic stirring, adding rapidly 0.48 mL of $1\times10^{-2}$ mol/L aqueous solution of sodium borohydride into the aqueous solution of palladium chloride, continue to react for 20 min, then obtaining 10 mL of Pd nanoparticle colloid containing $1\times10^{-4}$ mol/L of Pd; adding 1 mg of PVP into 4 mL of obtained Pd nanoparticle colloid, and magnetically stirring for 4 h. The surface-treated Pd nanoparticle is obtained.

The production of $La_{0.98}Eu_{0.02}OCl: 1\times10^{-4}Pd$, including the following steps: placing 3.1929 g of $La_2O_3$ and 0.0704 g of $Eu_2O_3$ into a beaker, dissolving in dense hydrochloric acid (HCl), heating to evaporate superfluous HCl, rare earth halide salt is obtained; adding certain amount of mixed solution of 10 ml of water and 60 ml of ethanol in volume ratio of 1:6, and adding said treated metal nanoparticles colloid, stirring completely; adding 10.507 g of citric acid monohydrate, herein the mole ratio of citric acid to metal ion in raw material is 5:1, then adding 16 g of polyethylene glycol (PEG, molecular weight is 10000), the concentration of polyethylene glycol is 0.20 g/ml, stirring in a 85° C. water bath for 2 h to obtain uniform and transparent precursor colloid; drying the colloid in blast drying oven at 100° C. for 12 h to evaporate solvent obtaining dry colloid; grinding the obtained dry colloid in powder, pre-calcinating in box-type high-temperature furnace at the temperature maintained at 500° C. for 2 h, cooling, grinding to obtain precursor; then placing the precursor into box-type high-temperature furnace, calcinating in air atmosphere at 800° C. for 5 h, naturally cooling. The desired luminescent material is obtained.

Example 5

Production of $La_{0.098}Y_{0.015}Dy_{0.005}OCl: 4.25\times10^{-4}Pt/Au$ by Using Sol-Gel Method The production of Pd/Au nanoparticles, including the following steps: weighing and dissolving 10.7 mg of chloroauric acid ($AuCl_3 \cdot HCl \cdot 4H_2O$) and 13.56 mg of chloroplatinic acid ($H_2PtCl_6 \cdot 6H_2O$) in 28 mL of deionized water; after dissolved completely, weighing and dissolving 22 mg of sodium citrate and 20 mg of PVP in the mixed solution under the condition of magnetic stirring; weighing and dissolving 5.7 mg of fresh-made sodium borohydride 10 mL of deionized water, obtaining 10 mL of $1.5\times10^{-2}$ mol/L aqueous solution of sodium borohydride; under the condition of magnetic stirring, adding 4 mL of $1.5\times10^{-2}$ mol/L aqueous solution of sodium borohydride into the mixed solution at once, continue to react for 20 min, then obtaining 30 mL of Pt/Au nanoparticle colloid containing $1.7\times10^{-3}$ mol/L of total metal particle; adding 12 mg of PVP into 2.5 mL of Pt/Au nanoparticle colloid, and magnetically stirring for 6 h. The surface-treated Pt/Au nanoparticle is obtained.

The production of $La_{0.098}Y_{0.01}Dy_{0.005}OCl: 4.25\times10^{-4}Pt/Au$, including the following steps: placing 3.1929 g of $La_2O_3$, 0.0339 g of $Y_2O_3$ and 0.0186 g of $Dy_2O_3$ into a beaker, dissolving in dense hydrochloric acid (HCl), heating to evaporate superfluous HCl, rare earth halide salt is obtained; adding certain amount of mixed solution of 10 ml of water and 80 ml of ethanol in volume ratio of 1:8, and adding said treated metal nanoparticles colloid, stirring completely; adding 8.4056 g of citric acid monohydrate, herein the mole ratio of citric acid to metal ion in raw material is 4:1, then adding 9.5 g of polyethylene glycol (PEG, molecular weight is 10000), the concentration of polyethylene glycol is 0.10 g/ml, stirring in a 80° C. water bath for 6 h to obtain uniform and transparent precursor colloid; drying the colloid in blast drying oven at 110° C. for 12 h to evaporate solvent obtaining dry colloid; grinding the obtained dry colloid in powder, pre-calcinating in box-type high-temperature furnace at the temperature maintained at 500° C. for 5 h, cooling, grinding to obtain precursor; then placing the precursor into box-type high-temperature furnace, calcinating in air atmosphere at 900° C. for 3 h, naturally cooling. The desired luminescent material is obtained.

Example 6

Production of $La_{0.97}Sc_{0.026}Tb_{0.004}OF: 2\times10^{-3}Ag$ by Using Sol-Gel Method The production of Ag nanoparticles, including the following steps: weighing and dissolving 3.40 mg of silver nitrate ($AgNO_3$) in 18.4 mL of deionized water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in 10 mL of deionized water obtaining 10 ml of $1.5\times10^{-2}$ mol/L aqueous solution of sodium borohydride; under the condition of magnetic stirring, adding 1.6 mL of $1.5\times10^{-2}$ mol/L aqueous solution of sodium borohydride into the aqueous solution of silver nitrate at once, continue to react for 10 min, then obtaining 20 mL of Ag nanoparticle colloid containing $1\times10^{-3}$ mol/L of Ag; adding 40 mg of PVP into 20 mL of obtained Ag nanoparticle colloid, and magnetically stirring for 6 h. The surface-treated Ag nanoparticle is obtained.

The production of $La_{0.97}Sc_{0.026}Tb_{0.004}OF: 2\times10^{-3}Ag$, including the following steps: placing 3.1604 g of $La_2O_3$, 0.0150 g of $Tb_4O_7$ and 0.0359 g of $Sc_2O_3$ into a beaker, dissolving in dense nitric acid ($HNO_3$), heating to evaporate superfluous $HNO_3$, rare earth nitrate is obtained; adding certain amount of mixed solution of 10 ml of water and 45 ml of ethanol in volume ratio of 1:5, and adding said treated metal nanoparticles colloid, stirring completely; adding 6.3042 g of citric acid monohydrate, to make the mole ratio of citric acid to metal ion in raw material be 3:1, then adding 6 g of polyethylene glycol (PEG, molecular weight is 10000) and 0.7778 g of $NH_4F$ (in excess of 5 mole percent), the concentration of polyethylene glycol is 0.10 g/ml, stirring in a 85° C. water bath for 4 h to obtain uniform and transparent precursor colloid; drying the colloid in blast drying oven at 110° C. for 8 h to evaporate solvent obtaining dry colloid; grinding the obtained dry colloid in powder, pre-calcinating in box-type high-temperature furnace at the temperature maintained at 600° C. for 3 h, cooling, grinding to obtain precursor; then placing the precursor into tube furnace, calcinating in reduction atmosphere (mixed gases of nitrogen and hydrogen in volume ratio of 95:5) at 900° C. for 4 h, naturally cooling. The desired luminescent material is obtained.

Example 7

Production of $La_{0.97}Ce_{0.03}OBr: 2\times10^{-4}Ag$ by Using Sol-Gel Method

The production of Ag nanoparticles, including the following steps: weighing and dissolving 3.40 mg of silver nitrate ($AgNO_3$) in 18.4 mL of deionized water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in 10 mL of deionized water obtaining 10 ml of $1.5 \times 10^{-2}$ mol/L aqueous solution of sodium borohydride; under the condition of magnetic stirring, adding 1.6 mL of $1.5 \times 10^{-2}$ mol/L aqueous solution of sodium borohydride into the aqueous solution of silver nitrate at once, continue to react for 10 min, then obtaining 20 mL of Ag nanoparticle colloid containing $1 \times 10^{-3}$ mol/L of Ag; adding 4 mg of PVP into 2 mL of obtained Ag nanoparticle colloid, and magnetically stirring for 6 h. The surface-treated Ag nanoparticle is obtained.

The production of $La_{0.97}Ce_{0.03}OBr$: $2 \times 10^{-4}Ag$, including the following steps: placing 3.1604 g of $La_2O_3$ and 0.1033 g of $CeO_2$ into a beaker, dissolving in dense nitric acid ($HNO_3$), heating to evaporate superfluous $HNO_3$, rare earth nitrate is obtained; adding certain amount of mixed solution of 10 ml of water and 46 ml of ethanol in volume ratio of 1:5, and adding said treated metal nanoparticles colloid, stirring completely; adding 4.2028 g of citric acid monohydrate, to make the mole ratio of citric acid to metal ion in raw material be 2:1, then adding 6 g of polyethylene glycol (PEG, molecular weight is 10000) and 2.9383 g of $NH_4Br$ (in excess of 50 mole percent), the concentration of polyethylene glycol is 0.10 g/ml, stirring in a 90° C. water bath for 4 h to obtain uniform and transparent precursor colloid; drying the colloid in blast drying oven at 110° C. for 8 h to evaporate solvent obtaining dry colloid; grinding the obtained dry colloid in powder, pre-calcinating in box-type high-temperature furnace at the temperature maintained at 500° C. for 4 h, cooling, grinding to obtain precursor; then placing the precursor into tube furnace, calcinating in reduction atmosphere (mixed gases of nitrogen and hydrogen in volume ratio of 90:10) at 800° C. for 6 h, naturally cooling. The desired luminescent material is obtained.

Example 8

Production of $La_{0.85}Gd_{0.1}Tb_{0.05}OF$: $5 \times 10^{-4}Au$ by Using Sol-Gel Method The production of Au nanoparticles, including the following steps: weighing and dissolving 4.12 mg of chloroauric acid ($AuCl_3 \cdot HCl \cdot 4H_2O$) in 8.4 mL of deionized water; after chloroauric acid dissolved completely, weighing and dissolving 14 mg of sodium citrate and 6 mg of cetyl trimethyl ammonium bromide in the aqueous solution of chloroauric acid under the condition of magnetic stirring; weighing and dissolving 1.9 mg of sodium borohydride and 17.6 mg of ascorbic acid in 10 mL of deionized water, respectively, obtaining 10 mL of $5 \times 10^{-3}$ mol/L aqueous solution of sodium borohydride and 10 mL of $1 \times 10^{-2}$ mol/L aqueous solution of ascorbic acid; under the condition of magnetic stirring, adding 0.04 mL aqueous solution of sodium borohydride into the aqueous solution of chloroauric acid, stirring and reacting for 5 min, and then adding 1.56 mL of $1 \times 10^{-2}$ mol/L aqueous solution of ascorbic acid into the aqueous solution of chloroauric acid, continue to react for 30 min, then obtaining 10 mL of Au nanoparticle colloid containing $1 \times 10^{-3}$ mol/L of Au; adding 7.5 mg of PVP into 5 mL of obtained Au nanoparticle colloid, and magnetically stirring for 8 h. The surface-treated Au nanoparticle is obtained.

The production of $La_{0.85}Gd_{0.1}Tb_{0.05}OF$: $5 \times 10^{-4}Au$, including the following steps: placing 2.7694 g of $La_2O_3$, 0.3625 g of $Gd_2O_3$ and 0.1869 g of $Tb_4O_7$ into a beaker, dissolving in dense nitric acid ($HNO_3$), heating to evaporate superfluous $HNO_3$, rare earth nitrate is obtained; adding certain amount of mixed solution of 10 ml of water and 50 ml of ethanol in volume ratio of 1:5, and adding said treated metal nanoparticles colloid, stirring completely; adding 8.5656 g of citric acid monohydrate, to make the mole ratio of citric acid to metal ion in raw material be 4:1, then adding 6.6 g of polyethylene glycol (PEG, molecular weight is 10000) and 0.9630 g of $NH_4F$ (in excess of 30 mole percent), the concentration of polyethylene glycol is 0.1 g/ml, stirring in a 85° C. water bath for 4 h to obtain uniform and transparent precursor colloid; drying the colloid in blast drying oven at 100° C. for 8 h to evaporate solvent obtaining dry colloid; grinding the obtained dry colloid in powder, pre-calcinating in box-type high-temperature furnace at the temperature maintained at 600° C. for 4 h, cooling, grinding to obtain precursor; then placing the precursor into tube furnace, calcinating in reduction atmosphere (CO) at 900° C. for 4 h, naturally cooling. The desired luminescent material is obtained.

Example 9

Production of $La_{0.995}Tm_{0.005}OCl$: $1 \times 10^{-4}Ag$ by Using Sol-Gel Method The production of Ag nanoparticles, including the following steps: weighing and dissolving 3.40 mg of silver nitrate ($AgNO_3$) in 18.4 mL of deionized water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in 10 mL of deionized water obtaining 10 ml of $1.5 \times 10^{-2}$ mol/L aqueous solution of sodium borohydride; under the condition of magnetic stirring, adding 1.6 mL of $1.5 \times 10^{-2}$ mol/L aqueous solution of sodium borohydride into the aqueous solution of silver nitrate at once, continue to react for 10 min, then obtaining 20 mL of Ag nanoparticle colloid containing $1 \times 10^{-3}$ mol/L of Ag; adding 2 mg of PVP into 0.5 mL of obtained Ag nanoparticle colloid, and magnetically stirring for 24 h. The surface-treated Ag nanoparticle is obtained.

The production of $La_{0.995}Tm_{0.005}OCl$: $1 \times 10^{-4}Ag$, including the following steps: placing 1.6209 g of $La_2O_3$ and 0.0096 g of $Tm_2O_3$ into a beaker, dissolving in dense hydrochloric acid (HCl), heating to evaporate superfluous HCl, rare earth halide salt is obtained; adding certain amount of mixed solution of 8 ml of water and 32 ml of ethanol in volume ratio of 1:5, and adding said treated metal nanoparticles colloid, stirring completely; adding 2.1014 g of citric acid monohydrate, herein the mole ratio of citric acid to metal ion in raw material is 2:1, then adding 4 g of polyethylene glycol (PEG, molecular weight is 10000), the concentration of polyethylene glycol is 0.10 g/ml, stirring in a 80° C. water bath for 6 h to obtain uniform and transparent precursor colloid; drying the colloid in blast drying oven at 110° C. for 12 h to evaporate solvent obtaining dry colloid; grinding the obtained dry colloid in powder, pre-calcinating in box-type high-temperature furnace at the temperature maintained at 500° C. for 5 h, cooling, grinding to obtain precursor; then placing the precursor into box-type high-temperature furnace, calcinating in air atmosphere at 800° C. for 4 h, naturally cooling. The desired luminescent material $La_{0.995}Tm_{0.005}OCl$: $1 \times 10^{-4}Ag$ is obtained. The no metal nano particle coating luminescent material $La_{0.995}Tm_{0.005}OCl$ is prepared using the same method.

Figure 2:
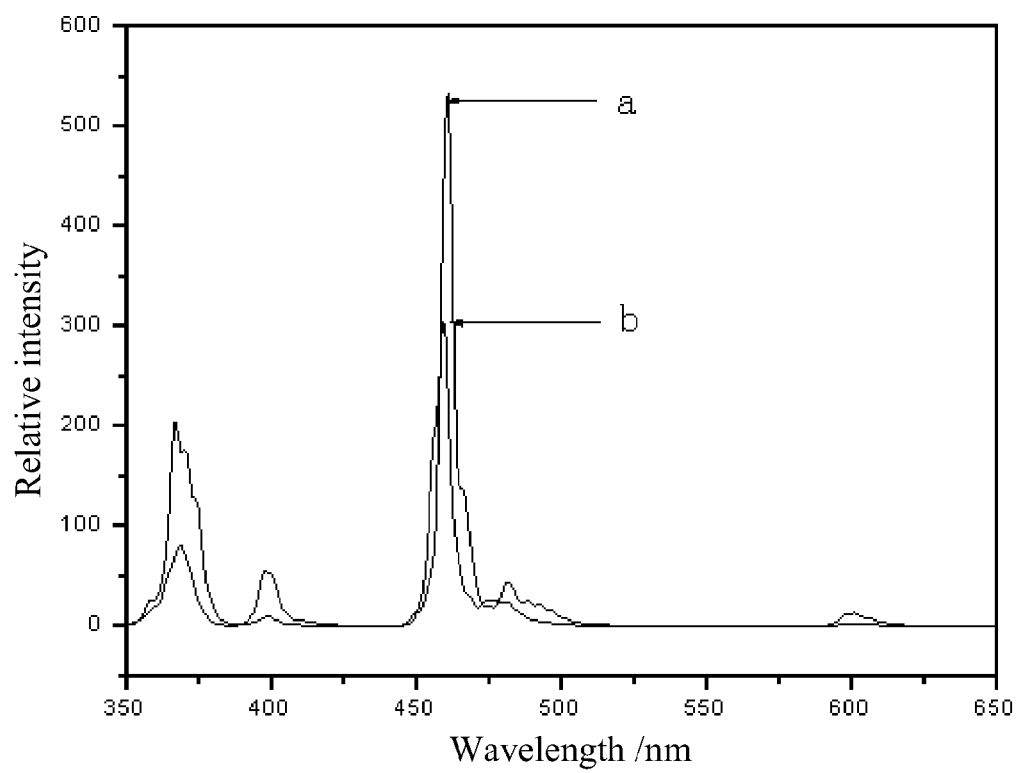
FIG. 2 is an emission spectrum of luminescent material excited by cathode ray under 3.0 KV acceleration voltage in Example 9 of the present invention with respect to $La_{0.995}Tm_{0.005}OCl$. Herein, curve a is the emission spectrum of the luminescent material $La_{0.995}Tm_{0.005}OCl$: $1\times10^{-4}Ag$; curve b is the emission spectrum of the luminescent material $La_{0.995}Tm_{0.005}OCl$ without Ag nanoparticles.

FIG. 2 is an emission spectrum of luminescent material $La_{0.995}Tm_{0.005}OCl$: $1 \times 10^{-4}Ag$ (curve a) excited by cathode ray under 3.0 KV acceleration voltage in the Example 9 of the present invention with respect to $La_{0.995}Tm_{0.005}OCl$ (curve b). It can be seen from the emission peak at 461 nm, that the luminous intensity of metal nano particle-coating fluorescent powder is increased by 78%, compared to the no metal nano particle coating fluorescent powder.

Example 10

Production of $La_{0.98}Dy_{0.02}OCl$: $5\times10^{-5}$Ag by Using Sol-Gel Method The production of Ag nanoparticles, including the following steps: weighing and dissolving 3.40 mg of silver nitrate ($AgNO_3$) in 18.4 mL of deionized water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in 10 mL of deionized water obtaining 10 ml of $1.5\times10^{-2}$ mol/L aqueous solution of sodium borohydride; under the condition of magnetic stirring, adding 1.6 mL of $1.5\times10^{-2}$ mol/L aqueous solution of sodium borohydride into the aqueous solution of silver nitrate at once, continue to react for 10 min, then obtaining 20 mL of Ag nanoparticle colloid containing $1\times10^{-3}$ mol/L of Ag; adding 1 mg of PVP into 0.25 mL of obtained Ag nanoparticle colloid, and magnetically stirring for 12 h. The surface-treated Ag nanoparticle is obtained.

The production of $La_{0.98}Dy_{0.02}OCl$: $5\times10^{-5}$Ag, including the following steps: placing 1.5965 g of $La_2O_3$ and 0.0373 g of $Dy_2O_3$ into a beaker, dissolving in dense hydrochloric acid (HCl), heating to evaporate superfluous HCl, rare earth halide salt is obtained; adding certain amount of mixed solution of 8 ml of water and 32 ml of ethanol in volume ratio of 1:5, and adding said treated metal nanoparticles colloid, stirring completely; adding 4.2028 g of citric acid monohydrate, herein the mole ratio of citric acid to metal ion in raw material is 4:1, then adding 4 g of polyethylene glycol (PEG, molecular weight is 10000), the concentration of polyethylene glycol is 0.10 g/ml, stirring in a 80° C. water bath for 6 h to obtain uniform and transparent precursor colloid; drying the colloid in blast drying oven at 100° C. for 12 h to evaporate solvent obtaining dry colloid; grinding the obtained dry colloid in powder, pre-calcinating in box-type high-temperature furnace at the temperature maintained at 500° C. for 5 h, cooling, grinding to obtain precursor; then placing the precursor into box-type high-temperature furnace, calcinating in air atmosphere at 800° C. for 4 h, naturally cooling. The desired luminescent material $La_{0.98}Dy_{0.02}OCl$: $5\times10^{-5}$Ag is obtained. The no metal nano particle coating luminescent material $La_{0.98}Dy_{0.02}OCl$ is prepared using the same method.

Figure 3:
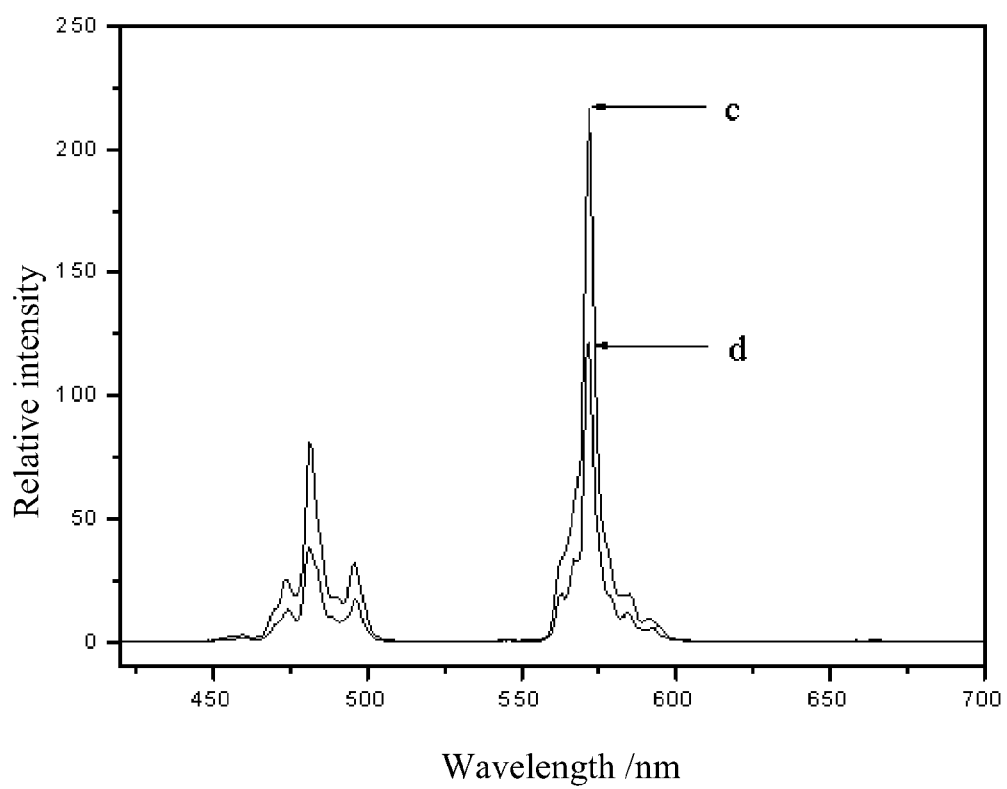
FIG. 3 is an emission spectrum of luminescent material excited by cathode ray under 3.0 KV acceleration voltage in Example 10 of the present invention with respect to $La_{0.98}Dy_{0.02}OCl$. Herein, curve c is the emission spectrum of the luminescent material $La_{0.98}Dy_{0.02}OCl$: $5\times10^{-5}Ag$; curve d is the emission spectrum of the luminescent material $La_{0.98}Dy_{0.02}OCl$ without Ag nanoparticles.

FIG. 3 is an emission spectrum of luminescent material $La_{0.98}Dy_{0.02}OCl$: $5\times10^{-5}$Ag (curve c) excited by cathode ray under 3.0 KV acceleration voltage in the present embodiment with respect to $La_{0.98}Dy_{0.02}OCl$ (curve d). It can be seen from the emission peak at 572 nm, that the luminous intensity of metal nano particle-coating fluorescent powder is increased by 79%, compared to the no metal nano particle coating fluorescent powder.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. An oxyhalide luminescent material doped with rare earth containing metal particles, wherein said oxyhalide luminescent material doped with rare earth containing metal particles has chemical formula of $Re'_{1-x}Re''_xOX$ and yM, wherein Re' is the first rare earth element, Re" is the second rare earth element; X is F, Cl or Br, M is metal nanoparticles, x is in the range of 0.001 to 0.15, and molar amounts y is in the range of $5\times10^{-5}-2\times10^{-3}$.

2. Oxyhalide luminescent material doped with rare earth containing metal particles as in claim 1, wherein said first rare earth element Re' is Y, La or Sc, said second rare earth element Re" is Tm, Tb, Eu, Sm, Gd, Dy or Ce.

3. Oxyhalide luminescent material doped with rare earth containing metal particles as in claim 1, wherein said metal nanoparticles M is Ag, Au, Pt or Pd metal nanoparticles.

4. A production method of oxyhalide luminescent material doped with rare earth containing metal particles, including the following steps:
   step 1: producing metal nanoparticles colloid;
   step 2: surface treating the metal nanoparticles by adding metal nanoparticles colloid to the polyvinylpyrrolidone solution;
   step 3: weighing rare earth oxide or rare earth oxalate and dissolving in dense nitric acid, heating and evaporating superfluous nitric acid to form rare earth nitrate;
   step 4: adding mixed solution of water and ethanol in volume ratio of 1:3 to 8 and metal nanoparticles obtained in step 2 into step 3, stirring, adding citric acid monohydrate to make the mole ratio of citric acid to metal ion be 1 to 5:1, adding polyethylene glycol and excess ammonium halide successively, heating in water bath and stirring to form precursor colloid;
   step 5: obtaining dry colloid by drying the precursor in step 4, grinding dry colloid in powder, pre-calcinating on constant temperature, cooling, calcinating in the air or reduction atmosphere after grinding, cooling to obtain oxyhalide luminescent material doped with rare earth containing metal particles, pre-calcinating is carried out in the temperature range of 500° C. to 800° C. for 2 to 6 h.

5. Production method of oxyhalide luminescent material doped with rare earth containing metal particles as in claim 4, wherein in said step 1, the method of producing metal nanoparticles colloid comprises: dissolving and diluting appropriate solution of metal salt in ethanol or water, under the conditions of magnetic stirring, successively adding assist agent which act the role as stabilizer and dispersant and adding reducing agent, after the reaction, metal nanoparticles colloid is obtained.

6. Production method as in claim 5, wherein said assist agent is polyvinylpyrrolidone, sodium citrate, cetyl trimethyl ammonium bromide, sodium dodecyl sulfate or sodium dodecyl sulfonate, said reducing agent is hydrazine hydrate, ascorbic acid, sodium citrate or sodium borohydride.

7. Production method as in claim 4, wherein in said step 4, the concentration of said polyethylene glycol is in the range of 0.01 to 0.20 g/ml, the heating in water bath is carried out in the temperature range of 75° C. to 90° C., the time of stirring is in the range of 2 to 8 h.

8. Production method as in claim 4, wherein when the halogen in oxyhalide luminescent material is chlorine, in said step 3, rare earth oxide or rare earth oxalate is dissolved in dense hydrochloric acid instead of dense nitric acid, heating and evaporating superfluous hydrochloric acid to form rare earth chloride.

9. Production method as in claim 4, wherein in said step 4, ammonium halide is in excess of 5% to 50% by mole ratio.

10. Production method as in claim 4, wherein in said step 5, said drying is carried out in the temperature range of 80° C. to 120° C. for 4 to 24 h.

11. Production method as in claim 4, wherein in said step 5, calcinating is carried out in the temperature range of 800° C. to 1000° C. for 2 to 6 h.

12. Production method as in claim 4, wherein in said step 5, said reduction atmosphere is selected from mixed gases of nitrogen and hydrogen, pure hydrogen, reduction atmosphere formed in carbonic oxide.

* * * * *